April 26, 1932.　　　A. J. ABEL　　　1,855,538
ACCELERATOR PEDAL CONTROL
Filed Aug. 6, 1931
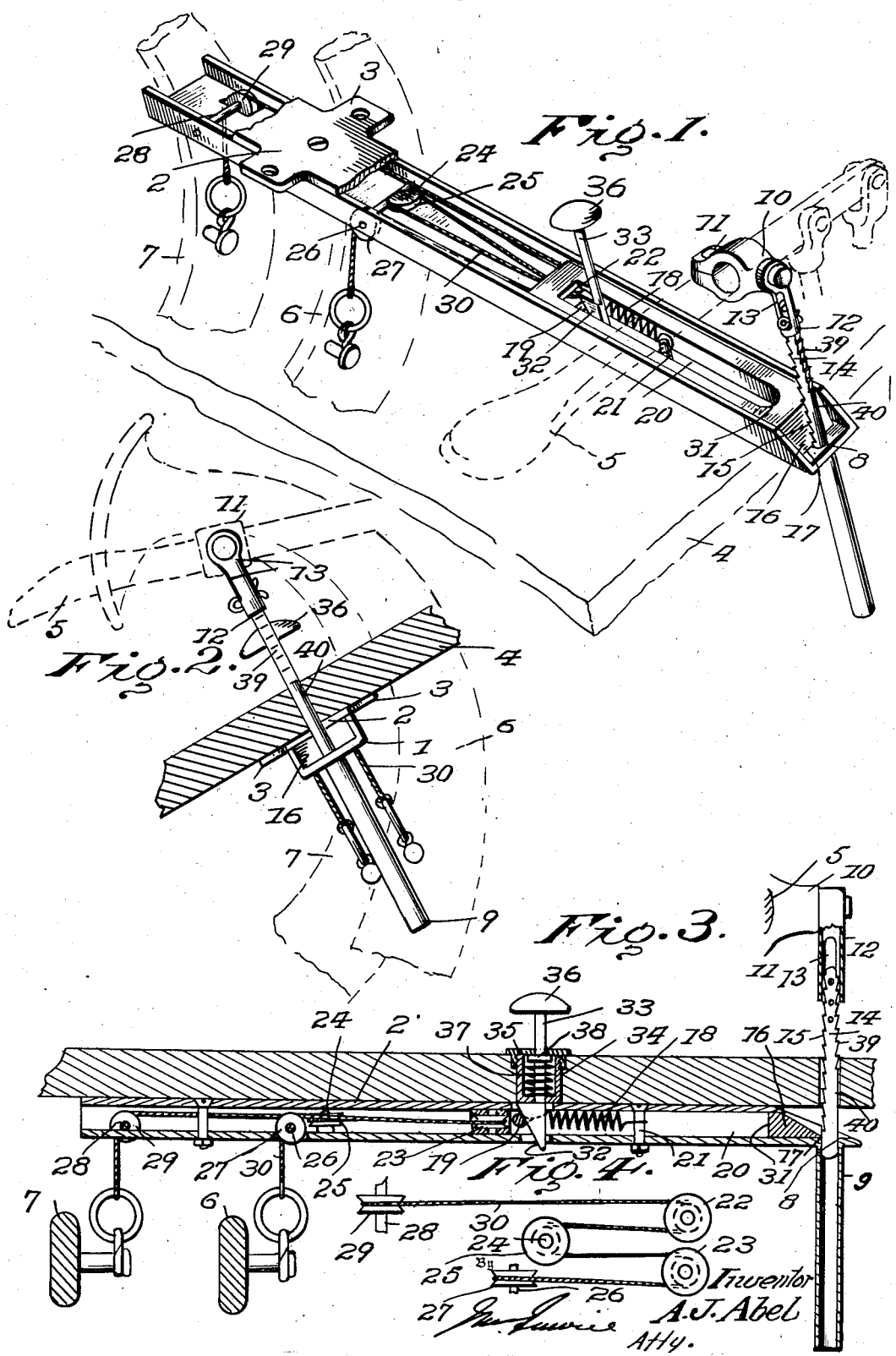

Patented Apr. 26, 1932

1,855,538

UNITED STATES PATENT OFFICE

ALF. J. ABEL, OF OZONE PARK, NEW YORK

ACCELERATOR PEDAL CONTROL

Application filed August 6, 1931. Serial No. 555,564.

This invention is directed to means for automatically setting the accelerator pedal of a motor vehicle in any selected position to maintain the speed of the car at a desired value without the necessity of maintaining physical control of the accelerator pedal, the construction including means by which the accelerator pedal may be automatically released for return to normal position following a predetermined movement of either the clutch or brake pedals.

In operating an automobile through the conventional and practically universal accelerator pedal, it is ordinarily necessary to maintain physical pressure on the pedal to keep the car at the desired speed. This requires the continued use of one foot of the driver which, in addition to the tiring effort thus necessitated, precludes complete freedom of both feet of the driver which might on occasion be necessary for the emergency use of the clutch and brake pedals.

The primary object of the present invention is, therefore, the provision of means by which, particularly on long driving stretches, the accelerator may be moved to the position of desired car speed, and automatically locked in this position to maintain the car at substantially constant, selective speed without further attention on the part of the driver; the invention also contemplating a control of this accelerator locking means, for release of the accelerator pedal, following a predetermined operation of either the brake or clutch pedals of the vehicle.

A further object of the invention is the provision of means by which the accelerator pedal locking means may be selectively released at any time without regard to either brake or clutch pedal operation, thus permitting the driver to return the accelerator pedal to normal or minimum position at will, either to reduce the speed of the car or for a further selective setting of the accelerator pedal.

A further object and as a modification is the provision of means by which the locking means for the accelerator pedal is maintained ineffective for any predetermined initial movement of such pedal, thereby permitting the driver to control the accelerator pedal directly in the ordinary way for comparatively slow speeds and at the same time and with the same mechanism automatically lock the accelerator pedal for higher car speeds.

The invention is illustrated in the accompanying drawings, in which:—

Figure 1 is a perspective view showing the apparatus in position, the floor board being shown in dotted lines and parts broken away;

Figure 2 is a longitudinal section taken in front of the locking bar;

Figure 3 is a central vertical section through the casing and floor board;

Figure 4 is a diagram of pulleys and operating cable.

The improved mechanism comprises an elongated, rectangular casing 1 provided with a removable cover 2 and having transverse straps 3 by which the casing as a whole may be secured beneath the floor board 4 of the vehicle, extending from a point adjacent the accelerator pedal 5 to a point overlying the brake lever 6 and clutch lever 7. That end of the casing adjacent the accelerator pedal is centrally formed with an opening 8 which registers with a depending, cylindrical casing 9 secured to the bottom wall of the casing 1.

An arm 10 is secured to the accelerator pedal 5 by a split clamp 11, and depending from the arm 10 is a sleeve 12 having an elongated slot 13 in opposing walls. Movable in the sleeve 12 is a locking rod 14 which in one form is provided with a longitudinal series of teeth 15 extending substantially throughout the full length of the rod. The rod is secured to the sleeve 12 by a pin passing through an opening in the rod and through the opposed slots 13 in the sleeve, whereby a limited operative movement of the accelerator pedal is permitted without affecting corresponding movement of the locking rod. That is to say, the accelerator pedal may be depressed for an appreciable distance, to manually control the running of the car at low speeds in the usual way without affecting any movement of the locking rod.

A locking bolt or catch member 16, preferably having a width corresponding to the interior width of the casing 1, is slidably mounted in such casing and forming with a terminal edge or nose 17, preferably by downwardly sloping the forward end of the bar. This bar is held in normal locking position by a spring 18 secured to a pin 19 projecting from one wall of a longitudinal slot 20 in the locking bar, the opposite end of the spring being fixed to a pin or bolt, such, for example, as one of the bolts for securing the cover to the casing, and indicated at 21.

The locking bolt 14 is of such length that when the accelerator pedal is in normal position the lower end of the locking bolt depends in the casing 9, and the teeth 15 are arranged in the bolt on the side of the bolt next the nose 17 of the locking bolt. The normal position of the locking bolt is such that its nose 17 will engage any particular tooth 15 in the bar 14 which may be in alignment with the nose 17 of the bolt. Obviously, on depression of the accelerator pedal to that extent necessary to operate the locking bar 14, said bar will be moved downwardly into the casing 9, the teeth 15 riding over the nose 17 of the locking bolt and slightly moving the locking bolt against the tension of the spring 18. When the accelerator pedal has been moved to the position necessary to give the car the desired speed, the locking bolt will engage the locking bar and hold the accelerator pedal depressed to the appropriate point without further attention on the part of the driver.

In the event it is desired to apply the brakes or operate the clutch, in either of which events it is also desirable to reduce the speed of the engine, means must be provided by which the accelerator pedal will be released from its set position and permitted to return to normal or engine idling position. In providing for this result, there is arranged in the open end of the locking bolt remote from the nose 17, two small pulleys 22 and 23 operating on vertical pivots and arranged side by side. Fixed in the casing remote from any possible position of the locking bolt is a stub shaft 24 extending vertically of the casing and carrying at its upper end a pulley 25. A transverse shaft 26 is mounted in the side walls of the casing immediately beyond the pulley 25, and on this shaft is arranged a pulley 27, the plane of operation of which is at right angles to that of the pulley 25, with such pulley 27 preferably operating through an opening in the bottom wall of the casing. The position of the pulley 27 is immediately adjacent the brake pedal 6 of the vehicle. A second transverse shaft 28 is mounted in the side walls of the casing beyond the shaft 26, said shaft 28 carrying a pulley 29 operating through an opening in the bottom wall of the casing and in a plane at right angles to the plane of the pulley 25. The respective pulleys 26 and 28 are arranged adjacent opposite side walls of the casing, that is, one is on one side of the longitudinal median line of the casing and the other on the opposite side of such line. The pulley 29 is arranged in the casing in a position adjacent the clutch pedal 7.

A flexible connector 30, for example a strand of braided wire, has one terminal passed over the pulley 29 to and around the pulley 22 on the locking bolt, to and around pulley 25 on the casing, thence to and around the remaining pulley 23 on the locking bolt, and thence over the pulley 26. The respective terminals of the connector are connected to the brake and clutch pedals, that passing over the pulley 29 being connected to the clutch pedal and that passing over the pulley 27 to the brake pedal. Preferably these connections are such as to maintain a somewhat slack condition of the respective cable terminals between the pulleys 29 and 27 and the clutch and brake pedals in order to permit a somewhat limited operation of these pedals without effecting a pull on the cable. Thus a slight braking operation or a slipping of the clutch may be had without exercising any influence on the accelerator pedal locking means.

Obviously, with the arrangement described, and under selective operation of either the brake pedal or clutch pedal, or both, the cable 30 is drawn upon with the effect to move the locking bolt 16 against the tension of the spring 18 to withdraw the nose 17 of such locking bolt from the engaged tooth 15 of the locking bar 14. The usual spring (not shown) for returning the accelerator pedal to normal position then serves to move such pedal to reduce the speed of the car, at the same time moving the locking bar upwardly to provide a further setting as may be desired. It is to be noted that the forward wall of the slot 20 in the locking bar, that is, the wall next the nose 17, indicated at 31, will engage the pin 21 fixed to the casing before the opposite end of the locking bar can contact with the pulley 25, and thus liability of breakage of the pulley or interference with its operation in excessive movement of the locking bar is prevented.

In order to provide for releasing the lock by the accelerator pedal at will, and without the necessity of operating either the brake or clutch pedal, there is provided a cam member 32 arranged to engage the pin 19 on the locking bolt to which the spring 18 is connected. This cam member, which is in the nature of a wedge element, is carried at the lower end of a stem 33 operable in a nipple 34 fixed in the floor board 4, the stem passing through a cover 35 of the nipple and being provided above the cover with a button terminal 36. A spring 37 is arranged within the nipple bearing between the bottom thereof and a collar 38 on the stem, the spring acting to hold the stem 33 at its upper limit of movement and the wedge-shaped cam member in the withdrawn or inoperative position.

If the driver desires at any time to release the accelerator pedal, without actuating either the brake or clutch pedals, pressure on the button 36 depresses the wedge-shaped cam member 32 and, through cooperation of said wedge-shaped cam member and pin 19, the locking bolt is moved to release the locking bar 14, to thus permit the accelerator pedal to return to normal position.

The invention also contemplates means by which the accelerator pedal may be manually controlled in the usual manner throughout any desired range of selective speeds, with the capability of being locked in the manner previously described at other and higher speeds. To secure this result, the locking bar 14 is formed throughout its length with teeth 15 on one side as described and may be formed diametrically opposite the teeth 15 with additional teeth 39. The teeth 39, however, extend from the upper end of the locking bar for a determinate distance less than the length of that bar, leaving a plain non-toothed portion 40 throughout the lower range of the bar. With the bar positioned so that the teeth 39 and plain portion 40 are next the nose 17 of the locking bolt, it is apparent that the accelerator pedal may be operated throughout a range of movement serving to depress the locking bar to the extent of the plain portion 40, and that during this movement there will be no locking cooperation of the locking bolt, and the accelerator pedal is entirely manually controlled. On any further depression of the accelerator pedal, however, the toothed portion 39 will be positioned to be in cooperation with the locking bolt and the accelerator pedal will be correspondingly locked in such position. Obviously, the toothed portion 39 and the plain portion 40 of the locking bolt may be of any predetermined relative lengths and thus the driver may arrange to manually control the accelerator pedal in the usual way for comparatively slow speeds, with the capability of locking the pedal for holding it against the necessity of manual control for higher or road running speeds.

The invention as a whole is a unitary structure complete in itself, which may be readily applied to any automobile, the sole requisites being the connection of the locking bar to the accelerator pedal and the connection of the connector terminals 30 to the brake and clutch pedals. These connections are wholly concealed beneath the running board and the only visible element is the button 36. Of course, if desired, the lost motion connection between the clutch pedal and brake pedals may be made in any convenient manner, and the lost motion connection between the accelerator pedal and locking bar may, if desired, be omitted and the locking bar directly connected to the arms 10 by a removable pin or the like.

The lost motion connection between the accelerator pedal and the locking bar is, however, an important and useful adjunct, as, for example, if the car is proceeding at a fixed speed with the accelerator pedal locked, and requirement is had for additional power or speed, for a comparatively short time, as in hill climbing or the like, the accelerator pedal may be manually depressed to the extent of the lost motion for increasing the speed of the vehicle or the power of the engine on the vehicle for the required time, whereupon on releasing the accelerator pedal the latter returns to the position determined by the locked relation of the locking bar and bolt, or in other words the bar returns to the normally predetermined speed.

I claim:—

1. An accelerator pedal control for motor vehicles including a locking bar to be removably connected to the accelerator pedal, a locking bolt to hold the locking bar and thereby the accelerator pedal in predetermined position of acceleration, and a lost motion connection between the accelerator pedal and locking bar to permit selective increasing acceleration movement of the accelerator pedal without disturbing the position of the locking bar.

2. An accelerator pedal control for motor vehicles including a locking bar to be removably connected to the accelerator pedal and formed with teeth, a casing through which the locking bar is moved in the accelerating movement of the accelerating pedal, a locking bolt operable in the casing to cooperate with the teeth of the locking bar to hold the locking bar and thereby the accelerator pedal in predetermined operative position, and a connection between the locking bolt and the clutch and brake pedals of the vehicle to operate the bolt to release the locking bar on movement of either clutch or brake pedal.

3. An accelerator pedal control for motor vehicles including a locking bar to be removably connected to the accelerator pedal and formed with opposing sets of teeth, a casing to be secured to the floor board of the vehicle, a locking bolt movable in the casing and formed with a nose to engage the teeth of either set of the locking bar to hold said bar and thereby the accelerator pedal in predetermined position, the teeth of one set providing greater freedom of movement of the locking bar without cooperation with the locking bolt than the teeth of the other set, and manually operable means to operate the locking bolt to release the locking bar at will.

4. An accelerator pedal control for motor vehicles including a locking bar depending from the accelerator pedal and formed with teeth, a casing to be secured to the foot board of the vehicle and through which the locking bar extends, a locking bolt slidable in the casing and having a nose to engage the teeth of the locking bar, a spring for normally holding the locking bolt in locking bar engaging position, and a cable having terminal connections with the brake and clutch pedal of the vehicle, guided within the casing, and having sliding connection with the locking bolt to operate said bolt on movement of the clutch or brake pedal.

5. An accelerator pedal control for motor vehicles including a casing to be secured to the floor board of the vehicle, a locking bolt slidable in the casing, a cable guided in the casing and terminally connected to the clutch and brake pedals of the vehicle, said cable having a sliding connection with the locking bolt to move the locking bolt in an inoperative direction in the actuation of either the brake or clutch pedal, and a locking bar having a lost motion connection with the accelerator pedal and terminally guided in the casing, said locking bar and locking bolt being adapted for cooperation to hold the locking bar and thereby the accelerator pedal in predetermined position.

6. An accelerator pedal control for motor vehicles including a casing to be secured to the floor board of the vehicle, a locking bolt operative in the casing, means for retracting said bolt at will, a locking bar to be connected to the accelerator pedal, said bar being plain for a predetermined portion of its lower length and toothed for a predetermined portion of its upper length, the movement of the accelerator pedal and locking bar for a distance corresponding to the plain portion of the bar providing free manual control of the accelerator pedal, the movement of the accelerator pedal for a distance to move the toothed portion of the locking bar into cooperation with the locking bolt serving to lock the accelerator pedal against return movement.

7. An accelerator pedal control for motor vehicles including an arm to be removably secured to the accelerator pedal, a sleeve depending from the arm, a locking bar, means for connecting the locking bar and sleeve to permit a limited free vertical movement of the sleeve without operation of the locking bar, said locking bar being formed with teeth, a casing secured to the floor board of the vehicle, means carried by the casing for guiding the lower end of the locking bar, and a locking bolt slidable in the casing to engage the teeth of the locking bar for holding the accelerator pedal depressed.

8. An accelerator pedal control for motor vehicles including an arm to be removably secured to the accelerator pedal, a sleeve depending from the arm, a locking bar, means for connecting the locking bar and sleeve to permit a limited free vertical movement of the sleeve without operation of the locking bar, said locking bar being formed with teeth, a casing secured to the floor board of the vehicle, means carried by the casing for guiding the lower end of the locking bar, a locking bolt slidable in the casing to engage the teeth of the locking bar for holding the accelerator pedal depressed, and means for selectively operating the locking bolt to release the locking bar.

In testimony whereof I affix my signature.

ALF. J. ABEL.